United States Patent
Hunt

(10) Patent No.: US 11,234,368 B2
(45) Date of Patent: *Feb. 1, 2022

(54) CUTTER BAR ASSEMBLY FOR A HARVESTER

(71) Applicant: CNH Industrial America LLC, New Holland, PA (US)

(72) Inventor: Cory Douglas Hunt, Millersville, PA (US)

(73) Assignee: CNH Industrial America LLC

( * ) Notice: Subject to any disclaimer, the term of this patent is extended or adjusted under 35 U.S.C. 154(b) by 220 days.

This patent is subject to a terminal disclaimer.

(21) Appl. No.: 16/724,892

(22) Filed: Dec. 23, 2019

(65) Prior Publication Data

US 2021/0185908 A1   Jun. 24, 2021

(51) Int. Cl.
| A01D 41/14 | (2006.01) |
| A01D 34/30 | (2006.01) |
| A01D 41/127 | (2006.01) |

(52) U.S. Cl.
CPC ......... *A01D 41/141* (2013.01); *A01D 34/305* (2013.01); *A01D 41/1274* (2013.01); *A01D 41/145* (2013.01)

(58) Field of Classification Search
CPC .... A01D 34/28; A01D 34/246; A01D 34/283; A01D 34/305; A01D 41/1274; A01D 41/14; A01D 41/141; A01D 41/145
See application file for complete search history.

(56) References Cited

U.S. PATENT DOCUMENTS

| 4,313,294 A | * | 2/1982 | Martenas | ............ A01D 41/145 |
| | | | | 56/15.8 |
| 4,669,256 A | * | 6/1987 | Ermacora | ............ A01D 34/246 |
| | | | | 56/13.6 |

(Continued)

FOREIGN PATENT DOCUMENTS

| CA | 3072993 A1 | * | 6/2019 | ............ A01B 63/10 |
| EP | 0786200 B1 | | 5/2003 | |

(Continued)

OTHER PUBLICATIONS

U.S. Appl. No. 16/724,625, filed Dec. 23, 2019, Cory Douglas Hunt.

(Continued)

*Primary Examiner* — Adam J Behrens
(74) *Attorney, Agent, or Firm* — Peter Zacharias; Patrick Sheldrake

(57) ABSTRACT

An agricultural system includes an arm of a header. The arm is configured to rotate about a pivot joint. The agricultural system also includes a fluid-filled biasing member, an actuator, and a controller. The fluid-filled biasing member is configured to couple to the arm and to impart a torque onto the arm. The actuator is coupled to the fluid-filled biasing member and is configured to move the fluid-filled biasing member relative to the actuator to change the torque imparted by the fluid-filled biasing member onto the arm. The controller configured to receive an input indicative of a target flotation pressure of the arm output a signal to instruct the actuator to set a position of the fluid-filled biasing member relative to the actuator based at least in part on the target flotation pressure of the arm.

20 Claims, 6 Drawing Sheets

(56) References Cited

U.S. PATENT DOCUMENTS

| | | | |
|---|---|---|---|
| 5,359,836 A | 11/1994 | Zeuner et al. | |
| 6,073,431 A * | 6/2000 | Osborne | A01D 41/16 |
| | | | 56/15.7 |
| 6,230,089 B1 | 5/2001 | Lonn et al. | |
| 6,871,483 B1 | 3/2005 | Panoushek | |
| 7,866,133 B2 | 1/2011 | Funk et al. | |
| 7,877,976 B2 * | 2/2011 | Honas | A01D 57/20 |
| | | | 56/208 |
| 7,950,212 B1 | 5/2011 | Figgins et al. | |
| 7,992,374 B1 * | 8/2011 | Bich | A01D 41/141 |
| | | | 56/208 |
| 8,051,633 B2 * | 11/2011 | Figgins | A01D 34/283 |
| | | | 56/181 |
| 8,261,521 B2 | 9/2012 | Thompson | |
| 10,299,434 B2 | 5/2019 | Yanke et al. | |
| 10,959,374 B2 * | 3/2021 | Duerksen | A01D 57/20 |
| 2007/0163220 A1 * | 7/2007 | Ehrhart | A01D 75/28 |
| | | | 56/10.2 E |
| 2008/0078155 A1 * | 4/2008 | Goers | A01D 41/141 |
| | | | 56/15.8 |
| 2010/0083629 A1 * | 4/2010 | Klotzbach | A01D 41/14 |
| | | | 56/320.1 |
| 2014/0109536 A1 * | 4/2014 | Boeck | A01D 34/30 |
| | | | 56/14.7 |
| 2018/0153102 A1 | 6/2018 | Dunn et al. | |
| 2018/0359920 A1 * | 12/2018 | Dunn | A01B 63/108 |
| 2019/0003496 A1 | 1/2019 | Hunt et al. | |
| 2019/0110397 A1 | 4/2019 | Brimeyer et al. | |
| 2019/0110402 A1 * | 4/2019 | Vandeven | A01D 41/14 |
| 2020/0214204 A1 * | 7/2020 | Karst | A01B 59/064 |

FOREIGN PATENT DOCUMENTS

| | | |
|---|---|---|
| EP | 3427564 A1 | 1/2019 |
| EP | 3473076 A1 | 4/2019 |
| WO | 2018166797 A1 | 9/2018 |
| WO | 2019055521 A1 | 3/2019 |

OTHER PUBLICATIONS

U.S. Appl. No. 16/724,872, filed Dec. 23, 2019, Cory Douglas Hunt.

* cited by examiner

CUTTER BAR ASSEMBLY FOR A HARVESTER

BACKGROUND

The present disclosure generally relates to a cutter bar assembly for an agricultural system.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A harvester may be used to harvest crops, such as barley, beans, beets, carrots, corn, cotton, flax, oats, potatoes, rye, soybeans, wheat, or other plant crops. During operation of the harvester, the harvesting process may begin by removing a portion of a plant from a field using a header of the harvester. The header may cut the plant and transport the cut crops to a processing system of the harvester. Certain headers include a cutter bar assembly configured to cut a portion of each crop (e.g., a stalk), thereby separating the cut crop from the soil. The cutter bar assembly may extend along a substantial portion of the width of the header at a forward end of the header. The header may also include one or more belts positioned behind the cutter bar assembly relative to the direction of travel of the harvester. The belt(s) are configured to transport the cut crops to an inlet of the processing system.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In certain embodiments, an agricultural system includes an arm of a header. The arm is configured to rotate about a pivot joint. The agricultural system also includes a fluid-filled biasing member, an actuator, and a controller. The fluid-filled biasing member is configured to couple to the arm and to impart a torque onto the arm. The actuator is coupled to the fluid-filled biasing member and is configured to move the fluid-filled biasing member relative to the actuator to change the torque imparted by the fluid-filled biasing member onto the arm. The controller configured to receive an input indicative of a target flotation pressure of the arm output a signal to instruct the actuator to set a position of the fluid-filled biasing member relative to the actuator based at least in part on the target flotation pressure of the arm

DRAWINGS

These and other features, aspects, and advantages of the present disclosure will become better understood when the following detailed description is read with reference to the accompanying drawings in which like characters represent like parts throughout the drawings, wherein.

Figure 2:
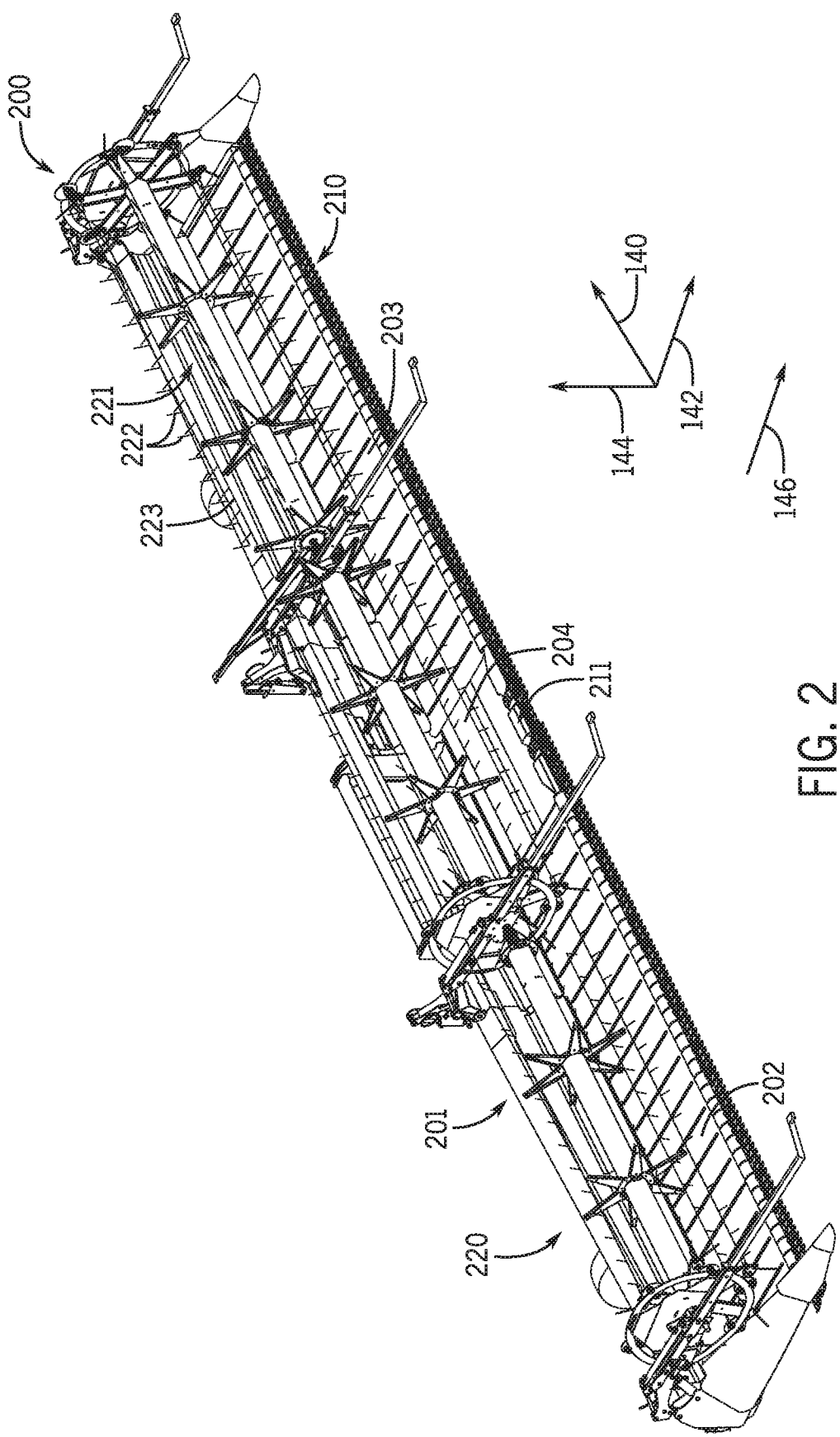
FIG. 2 is a perspective view of an embodiment of a header that may be employed within the agricultural system of FIG. 1, in accordance with an aspect of the present disclosure.
Figure 3:
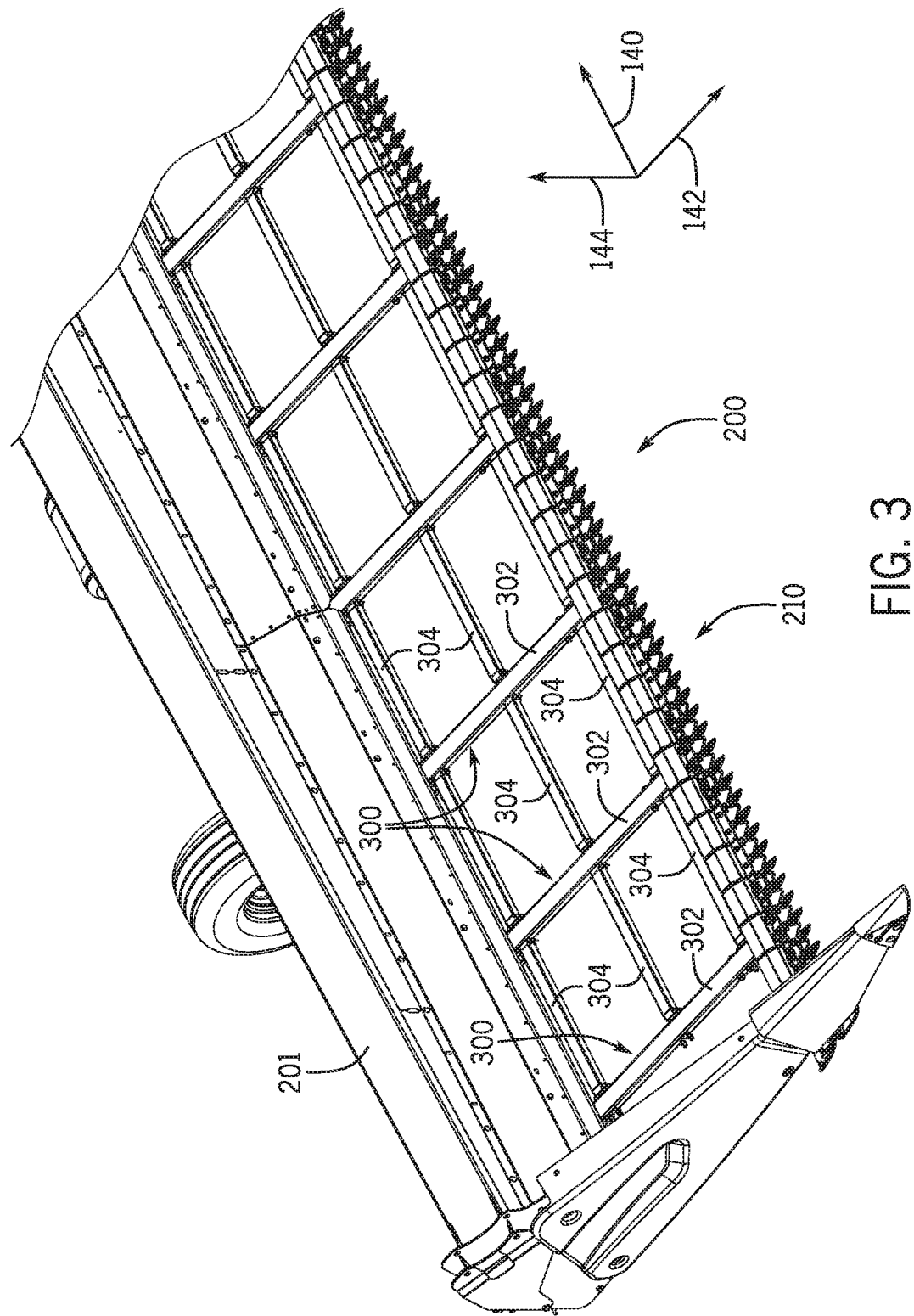
FIG. 3 is an expanded perspective view of a portion of the header of FIG. 2, in accordance with an aspect of the present disclosure.
Figure 5:
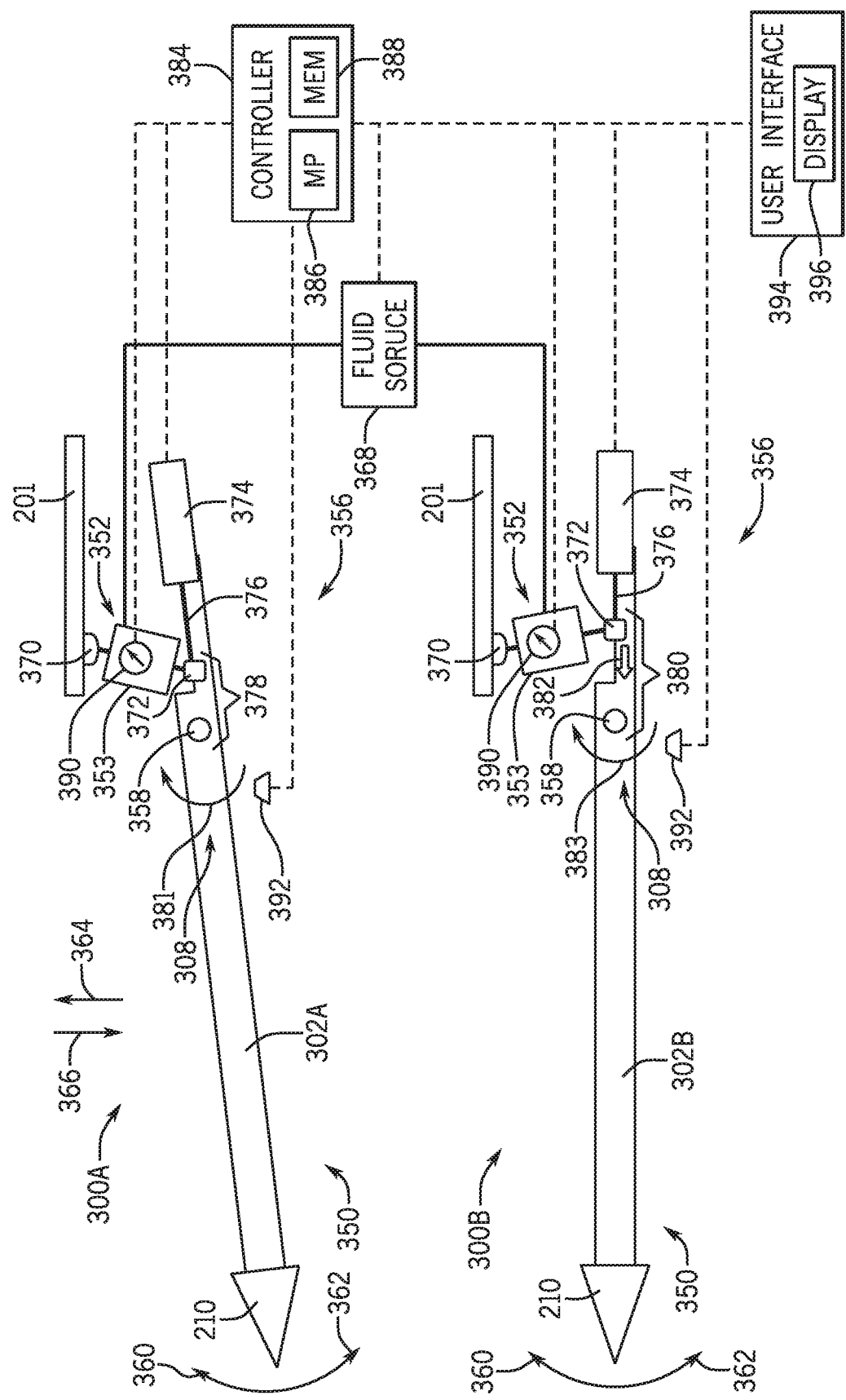
Figure 6:
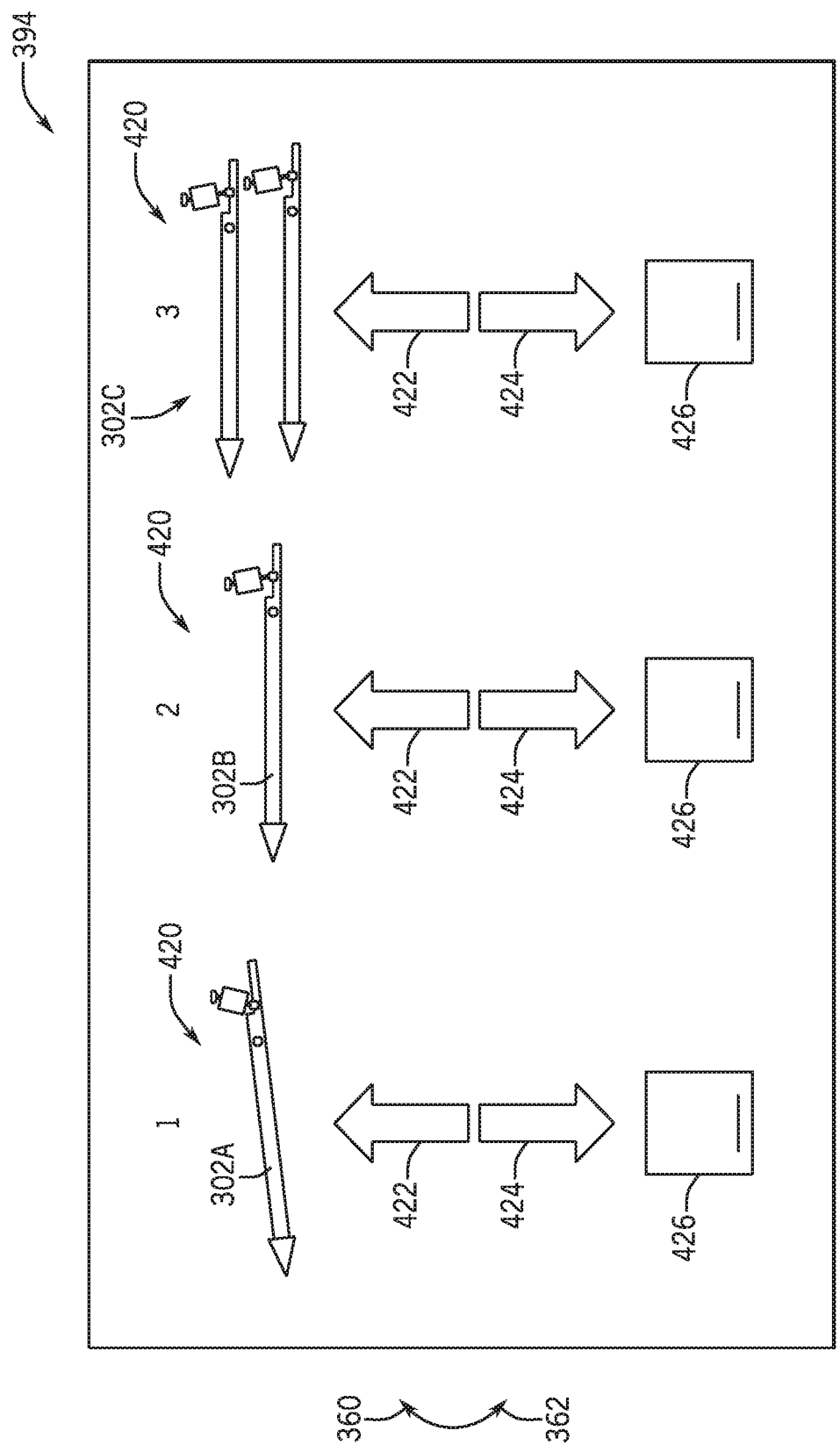

FIG. 5 is a side view of an embodiment of two arm assemblies that may be employed within the header of FIGS. 2 and 3, in accordance with an aspect of the present disclosure; and FIG. 6 is a schematic diagram of an embodiment of a user interface that may be used to set flotation pressures of various arms of arm assemblies that may be employed within the header of FIGS. 2 and 3, in accordance with an aspect of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The process of farming typically begins with planting seeds within a field. Over time, the seeds grow and eventually become harvestable crops. Typically, only a portion of each crop is commercially valuable, so each crop is harvested to separate the usable material from the remainder of the crop. For example, a harvester may cut crops within a field via a header, which may include a flexible draper header. The flexible draper header may include a cutter bar assembly configured to cut the crops. As the cutter bar assembly cuts the crops, a conveyor coupled to draper deck(s) of the header move the crops toward a crop processing system of the harvester. For example, the conveyor on the side draper deck(s) may move the cut crops toward an infeed draper deck at a center of the header. A conveyor on the infeed draper deck may then move the crops toward the processing system. The processing system may include a threshing machine configured to thresh the crops, thereby separating the crops into certain desired agricultural materials, such as grain, and material other than grain (MOG). The desired agricultural materials may be sifted and then accumulated into a tank. When the tank fills to capacity, the materials may be collected from the tank. The MOG may be discarded from the harvester (e.g., via a spreader) by passing through an exit pipe or a spreader to fall down onto the field.

The header may include arms that are coupled to the cutter bar assembly. As the harvester moves over a contoured field and/or performs certain operations, the arms may rotate relative to a header frame about a pivot point or joint to enable the cutter bar assembly to be positioned desirably for cutting the crops. For example, each of the side draper deck(s) and the infeed draper deck may include the arms and linkages that are coupled to pressurized fluid system(s) that include fluid-filled biasing members. Each arm may be connected to a respective fluid-filled biasing member that imparts a force on the cutter bar assembly to support the cutter bar assembly and to set a base position of the arm (e.g., a rotational position about the pivot point). Each fluid-filled biasing member may also enable some movement (e.g., rotation about the pivot point) of the respective arms to deviate slightly from the base position so as to enable the arms to follow a contour of the ground. By way of example, the ground may contact a part of the cutter bar assembly to exert a force onto some of the arms, thereby causing the arms to move from the base position. When the ground no longer contacts the part of the cutter bar assembly, a weight of the cutter bar assembly may cause the arms to move back to the base position and be supported by the respective fluid-filled biasing members.

It may be desirable to move the arms (e.g., about the respective pivot points) to different positions during operation of the harvester. For instance, an operator may desire to manually move some or all of the arms to change a force exerted by various portions of the cutter bar assembly onto the field, thereby changing how crops are cut by the cutter bar assembly or to avoid certain obstacles on the field. However, without the disclosed embodiments, it may be difficult to change the forces exerted by the arms onto the field and/or adjust the position of the arms relative to one another.

Thus, a system for changing the respective forces exerted by the arms onto the field independently of one another may improve the operation of the harvester. Accordingly, embodiments of the present disclosure are directed to a system that enables an operator to manually set the force exerted by each arm onto the field. For example, a position of each respective connection point between the fluid-filled biasing members and arms may be adjustable. By changing the connection point between a fluid-filled biasing member and a corresponding arm, a torque imparted by the fluid-filled biasing member for rotating the arm is also changed. In this way, changing the connection point may change an amount of rotation of the arm, thereby changing the contact between the arm and the field and the force exerted by the arm onto the field. For this reason, varying the connection points relative to one another may change the force exerted by the arm onto the field. Each respective connection point between the fluid-filled biasing member and the arm may be adjusted independently of one another to change the respective forces exerted by different portions of the cutter bar assembly onto the field.

Figure 1:
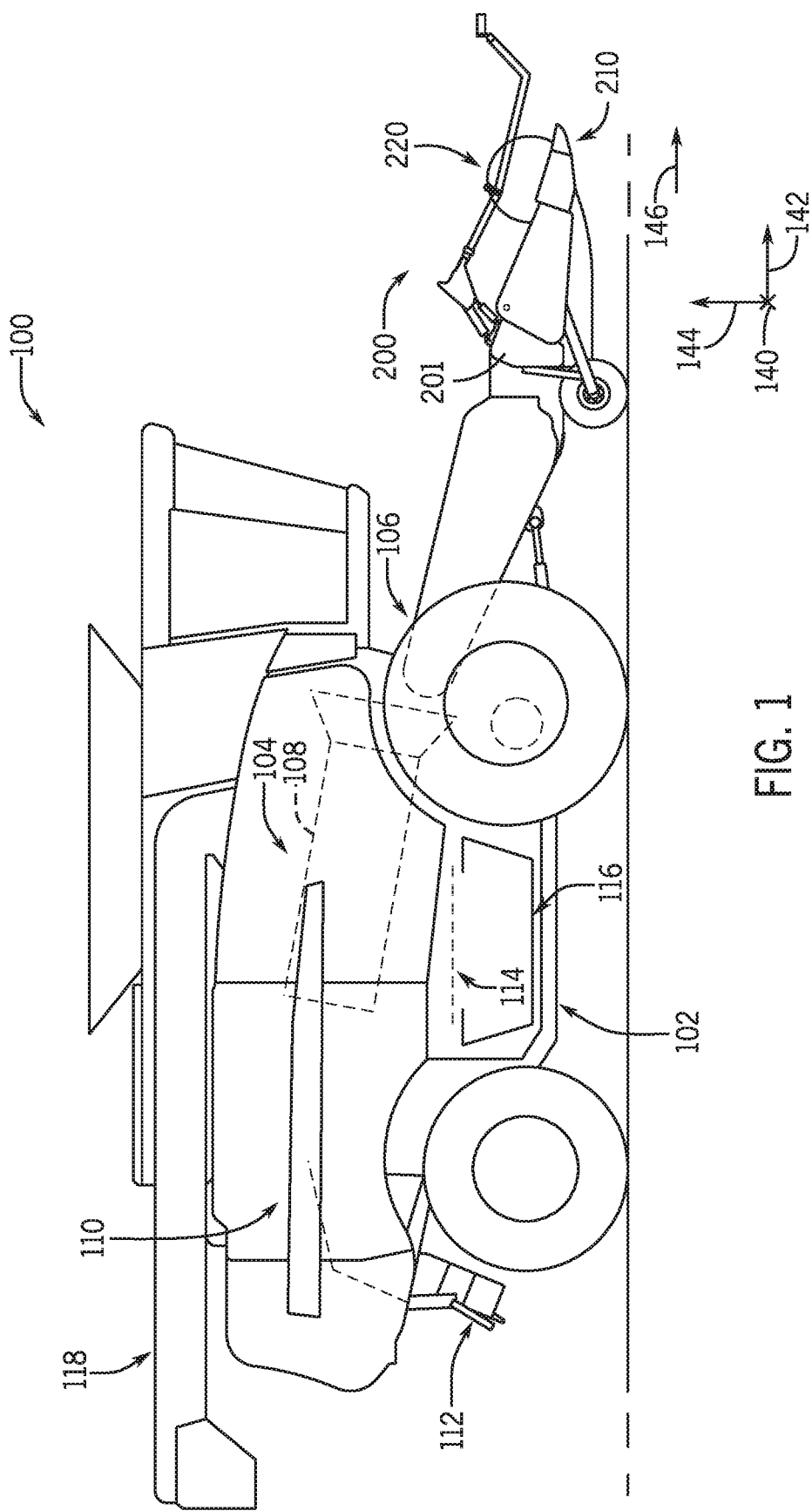
FIG. 1 is a side view of an embodiment of an agricultural system, in accordance with an aspect of the present disclosure.

With the foregoing in mind, FIG. 1 is a side view of an embodiment of an agricultural system 100, which may be a harvester. The agricultural system 100 includes a chassis 102 configured to support a header 200 and an agricultural crop processing system 104. As described in greater detail below, the header 200 is configured to cut crops and to transport the cut crops toward an inlet 106 of the agricultural crop processing system 104 for further processing of the cut crops. The agricultural crop processing system 104 receives the cut crops from the header 200 and separates desired crop material from crop residue. For example, the agricultural crop processing system 104 may include a thresher 108 having a cylindrical threshing rotor that transports the crops in a helical flow path through the agricultural system 100. In addition to transporting the crops, the thresher 108 may separate certain desired crop material (e.g., grain) from the crop residue, such as husks and pods, and may enable the desired crop material to flow into a cleaning system 114 (such as sieves) located beneath the thresher 108. The cleaning system 114 may remove debris from the desired crop material and transport the desired crop material to a storage tank 116 within the agricultural system 100. When the storage tank 116 is full, a tractor with a trailer on the back may pull alongside the agricultural system 100. The desired crop material collected in the storage tank 116 may be carried up by an elevator and dumped out of an unloader 118 into the trailer. The crop residue may be transported from the thresher 108 to a crop residue handling system 110, which may process (e.g., chop/shred) and remove the crop residue from the agricultural system 100 via a crop residue spreading system 112 positioned at an aft end of the agricultural system 100. To facilitate discussion, the agricultural system 100 and/or its components may be described with reference to a lateral axis or direction 140, a longitudinal axis or direction 142, and a vertical axis or direction 144. The agricultural system 100 and/or its components may also be described with reference to a direction of travel 146.

As discussed in detail below, the header 200 includes a cutter bar assembly 210 configured to cut the crops within the field. The header 200 also includes a reel assembly 220 configured to engage the crops to prepare the crops to be cut by the cutter bar assembly 210 and/or to urge crops cut by the cutter bar assembly 210 onto a conveyor system that directs the cut crops toward the inlet 206 of the agricultural crop processing system 104. The reel assembly 220 includes a reel having multiple fingers extending from a central framework. The central framework is driven to rotate such that the fingers engage the crops and urge the crops toward the cutter bar assembly 210 and the conveyor system. Additionally, the reel may be supported by multiple arms (e.g., reel arms) that are coupled to a frame 201 of the header 200. Each of the arms may be coupled to the frame 201 via a respective pivot joint. For example, one pivot joint is configured to enable a first arm of the multiple arms to pivot (e.g., about the lateral axis 140) relative to the frame 201, and another pivot joint is configured to enable a second arm of the multiple arms to pivot (e.g., about the lateral axis 140) relative to the frame 201.

FIG. 2 is a perspective view of an embodiment of the header 200 that may be employed within the agricultural system 100 of FIG. 1. In the illustrated embodiment, the header 200 includes the cutter bar assembly 210 configured to cut a portion of each crop (e.g., a stalk), thereby separating the crop from the soil. The cutter bar assembly 210 is positioned at a forward end of the header 200 relative to the longitudinal axis 142 of the header 200. As illustrated, the cutter bar assembly 210 extends along a substantial portion of the width of the header 200 (e.g., along the lateral axis 140). The cutter bar assembly 210 includes a blade support, a stationary guard assembly, and a moving blade assembly. The moving blade assembly is fixed to the blade support (e.g., above the blade support along the vertical axis 144 of the header 200), and the blade support/moving blade assembly is driven to oscillate relative to the stationary guard assembly. In the illustrated embodiment, the blade support/moving blade assembly is driven to oscillate by a driving mechanism 211 positioned at a center of the header 200. However, in other embodiments, the blade support/moving blade assembly may be driven by another suitable mechanism (e.g., located at any suitable position on the header 200). As the agricultural system 100 is driven through the field, the cutter bar assembly 210 engages crops within the field, and the moving blade assembly cuts the crops (e.g., the stalks of the crops) in response to engagement of the cutter bar assembly 210 with the crops.

In the illustrated embodiment, the header 200 includes a first conveyor section 202 on a first lateral side of the header 200 and a second conveyor section 203 on a second lateral side of the header 200 opposite the first lateral side. The conveyor sections 202, 203 may be separate from one another. For instance, the first conveyor section 202 may extend along a portion of the width of the header 200 and the second conveyor section 203 may extend along another portion of the width of the header 200. Each conveyor section 202, 203 is driven to rotate by a suitable drive mechanism, such as an electric motor or a hydraulic motor. The first conveyor section 202 and the second conveyor section 203 are driven such that a top surface of each conveyor section 202, 203 moves laterally inward to a center conveyor section 204 positioned between the first conveyor section 202 and the second conveyor section 203 along the lateral axis 140. The center conveyor section 204 may also be driven to rotate by a suitable drive mechanism, such as an electric motor or a hydraulic motor. The center conveyor section 204 is driven such that the top surface of the center conveyor section 204 moves rearwardly relative to the direction of travel 146 toward the inlet. As a result, the conveyor sections 202, 203, 204 transport the cut crops through the inlet to the agricultural crop processing system for further processing of the cut crops. Although the illustrated header 200 includes two conveyor sections 202, 203 configured to direct crops toward the center conveyor section 204, there may be any suitable number of conveyor sections in additional or alternative embodiments directing the crops toward the center conveyor section.

In the illustrated embodiment, the crops cut by the cutter bar assembly 210 are directed toward the conveyor sections 202, 203 at least in part by the reel assembly 220, thereby substantially reducing the possibility of the cut crops falling onto the surface of the field. The reel assembly 220 includes a reel 221 having multiple fingers 222 extending from a central framework 223. The central framework 223 is driven to rotate such that the fingers 222 move (e.g., in a circular pattern). The fingers 222 are configured to engage the crops and urge the cut crops toward the conveyor sections 202, 203 to facilitate transportation of the cut crops to the agricultural crop processing system.

As illustrated herein, the cutter bar assembly 210 is flexible along the width of the header 200. As discussed in detail below, the cutter bar assembly 210 is supported by multiple arm assemblies distributed along the width of the header 200. In some embodiments, the frame 201 of the header 200 may be movably coupled to the chassis of the agricultural system. Each arm assembly is mounted to the frame 201 and includes an arm coupled to the cutter bar assembly 210. The arm may rotate and/or move the cutter bar assembly 210 along the vertical axis 144 relative to the frame 201, thereby enabling the cutter bar assembly 210 to flex during operation of the agricultural system. Thus, the cutter bar assembly 210 may follow the contours of the field, thereby enabling the cutting height (e.g., the height at which each crop is cut) to be substantially constant along the width of the header 200.

FIG. 3 is a perspective view of a portion of the header 200 of FIG. 2, further illustrating the frame 201, the cutter bar assembly 210, and arm assemblies 300 that support the cutter bar assembly 210. As illustrated, each arm assembly 300 includes an arm 302 that extends substantially along the longitudinal axis 142. However, in alternative embodiments, each arm may extend in any suitable direction. In the illustrated embodiment, the arm assemblies 300 are distributed along the width of the header 200. The spacing between the arm assemblies 300 may be selected to enable the arm assemblies 300 to support the cutter bar assembly 210 and to enable the cutter bar assembly 210 to flex during operation of the header 200. As discussed in detail below, each arm 302 is coupled to the frame 201 by a fluid-filled biasing member and an actuator of the respective arm assembly 300. The fluid-filled biasing member and the actuator enable the arm to rotate and/or move vertically (e.g., along the vertical axis 144) relative to the frame 201, thereby enabling the cutter bar assembly 210, which is supported by the arms 302, to flex in response to variations in the contours of the field. The ability of the cutter bar assembly 210 to flex enables the agricultural system to precisely cut the crops at a target height, thereby increasing crop yields while harvesting.

In the illustrated embodiment, lateral supports 304 extend between respective pairs of arms 302. A first end of each lateral support 304 is pivotally coupled to one arm 302, and a second end of each lateral support 304 is pivotally coupled to another arm 302. The lateral supports 304 are configured to support the respective conveyor sections (e.g., extend through a respective opening defined by each conveyor section), while enabling the arms 302 to rotate/move relative to the frame 201. While three lateral supports 304 are positioned between each pair of arms 302 in the illustrated embodiment, in additional or alternative embodiments, more or fewer lateral supports may be positioned between at least one pair of arms. Furthermore, in certain embodiments, the lateral supports may be omitted between at least one pair of arms.

Figure 4:
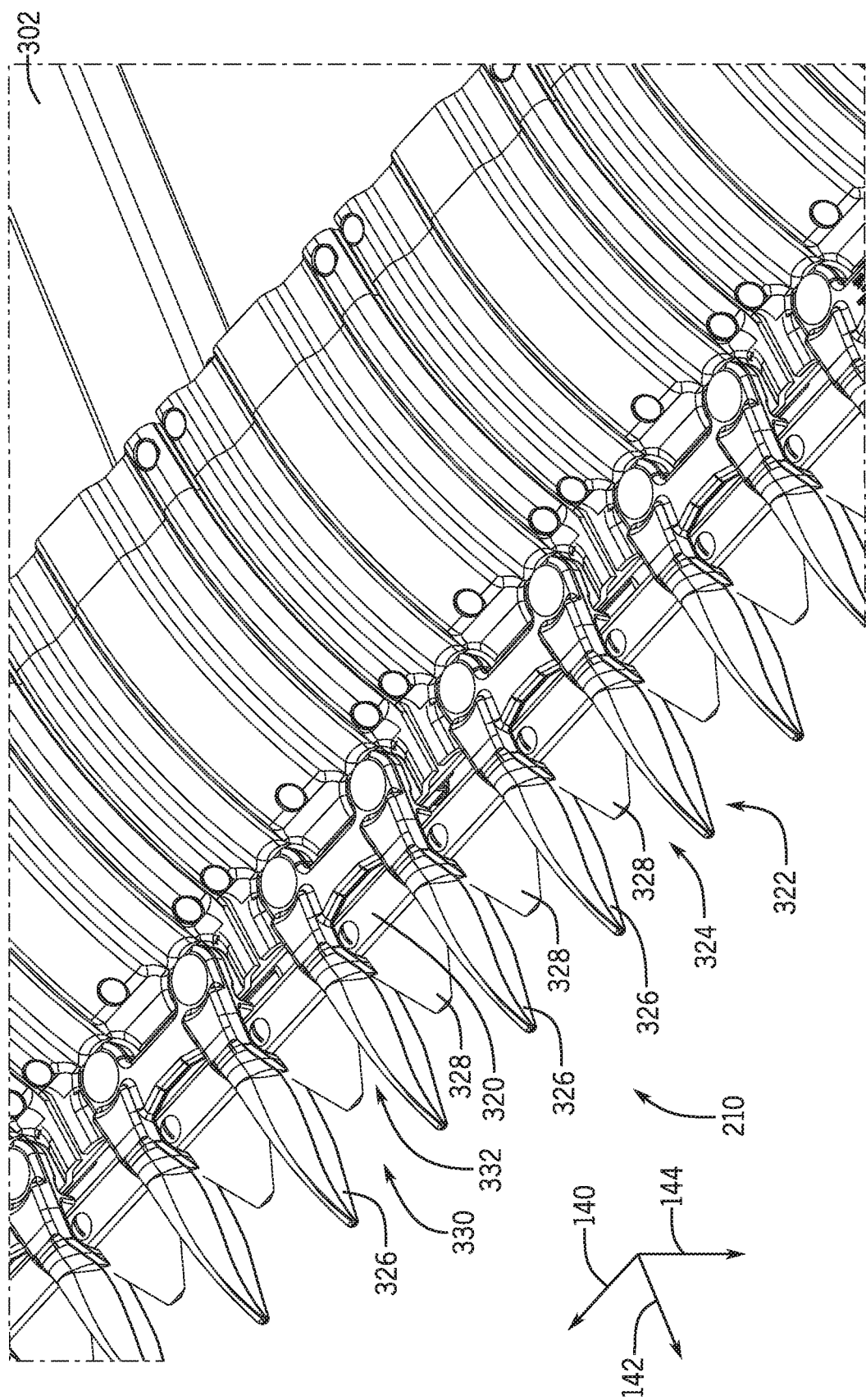
FIG. 4 is an expanded perspective view of an embodiment of a portion of a cutter bar assembly that may be employed within the header of FIGS. 2 and 3, in accordance with an aspect of the present disclosure.

FIG. 4 is an expanded perspective view of an embodiment of the cutter bar assembly 210 that may be employed within the header of FIGS. 2 and 3. As illustrated, the cutter bar assembly 210 includes a blade support 320, a stationary guard assembly 322, and a moving blade assembly 324 coupled to the blade support 320. The moving blade assembly 324 is coupled to the blade support 320. The blade support 320 and the moving blade assembly 324 are driven to oscillate relative to the stationary guard assembly 322. The stationary guard assembly 322 includes multiple stationary guards 326 distributed along the width of the stationary guard assembly 322 (e.g., along the lateral axis 140), and the moving blade assembly 324 includes multiple moving blades 328 distributed along the width of the moving blade assembly 324 (e.g., along the lateral axis 140). As the moving blade assembly 324 is driven to oscillate, the moving blades 328 move relative to the stationary guards 326. When the header is moved through the field by the agricultural system, a portion of a crop (e.g., the stalk) may enter a gap 330 between adjacent stationary guards 326 and a gap 332 between adjacent moving blades 328. Movement of the moving blade assembly 324 causes a moving blade 328 to move across the gap 330 in the stationary guard assembly 322, thereby cutting the portion of the crop.

In the illustrated embodiment, the stationary guard assembly 322 is coupled to one of the arms 302 (e.g., via fasteners). In addition, the blade support 320 and the moving blade assembly 324 are movably coupled to the stationary guard assembly 322 (e.g., the blade support 320 and the moving blade assembly 324 pass through openings in the stationary guards 326). The arms 302 and the blade support 320 may be flexible, thereby enabling the cutter bar assembly 210 to flex in response to variations in the soil surface (e.g., while the cutter bar assembly 210 is in contact with the soil surface).

FIG. 5 is a side view of an embodiment of the arm assembly 300 that may be employed within the header 200 of FIGS. 2 and 3. In this example, the arm assembly 300 includes the arm 302 that is configured to support a portion of the cutter bar assembly 210. As illustrated, the arm 302 is coupled to the cutter bar assembly 210 at a first end 350 (e.g., a first end portion) and is coupled to a fluid-filled biasing member 352 and to an actuator 374 at a second end 356 (e.g., a second end portion). The fluid-filled biasing member 352 may impart a force onto the second end 356 of the arm 302 to position the arm 302. For instance, the arm assembly 300 is configured to pivot about a pivot joint 358 (e.g., a pin), thereby rotating relative to the frame 201 of the header. In this manner, the portion of the cutter bar assembly 210 coupled to the arm 302 may move in a first direction 360 and/or in a second direction 362 relative to the frame 201. Further, the fluid-filled biasing member 352 may include a flexible container 363 (e.g., an air bag) configured to hold an amount of fluid (e.g., air) to substantially maintain a base position of the arm 302. As used herein, the base position of the arm 302 refers to a position of the arm 302 about the pivot joint 358 when no force (e.g., an external force, such as due to contact with the ground and/or contact with an obstacle) is exerted onto the cutter bar assembly 210 at the first end 350.

During operation of the agricultural system, the position of the arm 302 about the pivot joint 358 may deviate from the base position. For example, the fluid pressurizes the container 363 of the fluid-filled biasing member 352 to at least partially inflate the container 363. As the agricultural system moves over the crop field during operation, the crop field may exert a force in an upward direction 364 onto the cutter bar assembly 210 near the first end 350 of the arm 302, thereby causing the second end 356 of the arm 302 to impart a force in a downward direction 366 onto the container 363. The force imparted in the downward direction 366 onto the container may expand the container 363, thereby enabling the cutter bar assembly 210 to move in the first direction 360. However, when the crop field no longer exerts a force onto the cutter bar assembly 210 (e.g., the header is raised), a weight of the cutter bar assembly 210 exerts a force in the downward direction 366 at the first end 350 of the arm 302 and causes the second end 356 of the arm 302 to impart a force in the upward direction 364 onto the container 363. The force in the upward direction 364 may compress the container 363, thereby enabling the cutter bar assembly 210 to move in the second direction 362. Movement of the cutter bar assembly 210 in the second direction 362 may move the cutter bar assembly 210 toward the crop field, such as to remain in contact with the crop field. In this way, the fluid-filled biasing members 352 may cause the arm 302 to float and move in response to various forces imparted onto the cutter bar assembly 210. Accordingly, the fluid-filled biasing member 352 may enable the cutter bar assembly 210 to move in the directions 360, 362 to follow the contour of the crop field.

Furthermore, the base position of the arms 302 may create a particular flotation pressure associated with the arm. As used herein, the flotation pressure refers to a contact force or pressure exerted by the cutter bar assembly 210 onto the crop field. By way of example, adjusting the base position of the arm 302 to lower the first end 350 of the arm 302 while the position of the header (e.g., relative to the crop field) is maintained may increase the flotation pressure. Similarly, adjusting the base position of the arm 302 to raise the first end 350 of the arm 302 while the position of the header (e.g., relative to the crop field) is maintained may increase the flotation pressure.

The fluid pressure of the container 353 may maintain a shape of the container 353, thereby maintaining a rigidity or stiffness of the container 353 to block movement of the cutter bar assembly 210 in the first and second directions 360, 362. For example, increasing the fluid pressure within the container 353 may increase the inflation of the container 353, thereby increasing an amount of force that may have to be imparted to deform the container 353. As such, increasing the fluid pressure within the container 353 increases the stiffness of the fluid-filled biasing member 352 and increases an amount of force that may have to be imparted in order to rotate the arm 302. However, reducing the fluid pressure within the container 353 may reduce the inflation of the container 353, thereby reducing the amount of force that may have to be imparted to deform the container 353. Thus, reducing the fluid pressure within the container 353 reduces the stiffness of the fluid-filled biasing member 352 and reduces an amount of force that may have to be imparted to rotate the arm 302. The fluid pressure of the container 353 may also cause the fluid-filled biasing member 352 to impart a force onto the second end 356 of the arm 302. By way of example, increasing the amount of fluid pressure in the container 353 may inflate and expand the container 353 to increase a force exerted in the downward direction 366 at the second end 356. Thus, increasing the fluid pressure in the container 353 may move the base position of the arm 302 in the first direction 360 (e.g., to reduce the flotation pressure). In addition, reducing the amount of fluid pressure in the container 353 may enable the container 353 to deflate to reduce the force exerted in the downward direction 366 at the second end 356 (e.g., to increase the flotation pressure). As such, reducing the fluid pressure in the container 353 may cause the weight of the cutter bar assembly 210 to move the base position of the arm 302 in the second direction 362.

Each container 353 may be fluidly coupled to a fluid source 368, which may be an air blower, for example. The fluid source 368 may be configured to supply fluid to each container, thereby increasing the fluid pressure within the respective containers 353, or to receive fluid from each container 353, thereby reducing the fluid pressure within the respective containers 353. In the illustrated embodiment, each container 353 is fluidly coupled to the same fluid source 368 to reduce a cost associated with installing multiple fluid sources onto the agricultural system. Furthermore, the fluid source 368 may be configured to provide substantially the same amount of fluid to each container 353. In this way, the fluid source 368 may pressurize each container 353 to substantially the same fluid pressure so as to exert substantially the same force onto the second end 356 of each arm 302. However, it may be desirable to adjust the base position of each arm 302 relative to one another, such as without having to change the fluid pressure of the container 353 of the fluid-filled biasing member 352 coupled to the arm 302, in order to change the respective flotation pressures associated with each arm 302.

To this end, a connection point between the fluid-filled biasing member 352 and the arm 302 may be adjustable (e.g., for setting the flotation pressure associated with the arm 302 more quickly compared to adjusting the fluid pressure within the container 363 via the fluid source 368). In the illustrated embodiment, a first support 370 of each fluid-filled biasing member 352 may be coupled to the frame 201. In some embodiments, the respective first supports 370 may be fixedly coupled to the frame 201 such that a position of the first support 370 relative to the frame 201 does not substantially change. A second support 372 of each fluid-filled biasing member 352 may be coupled (e.g., slidingly coupled) to a respective arm 302, and the second support 372 may be configured to translate along the arm 302. By way of example, the second support 372 may be fixedly coupled to a respective carriage or bearing configured to slide along the arm 302 so as to translate the second support 372 along the arm 302. In certain embodiments, the second support 372 may be moved by a respective actuator 374, such as a hydraulic, pneumatic, or electromechanical actuator, of the arm assembly 300. For instance, each actuator 374 may have a rod 376 that is coupled to the second support 372 of the fluid-filled biasing member 352. The actuator 374 may linearly extend and retract the rod 376, thereby moving the second support 372 linearly along the arm 302.

By way of example, the actuator 374 of a first arm assembly 300A may position the second support 372 to be at a first distance 378 away from the pivot joint 358. Furthermore, the actuator 374 of a second arm assembly 300B may position its rod 376 at a second distance 380 away from the pivot joint 358. In the illustrated embodiment, the second distance 380 is greater than the first distance 378. In this manner, the fluid-filled biasing member 352 of the first arm assembly 300A exerts a force onto a first arm 302A at a location more proximate to its pivot joint 358, and the fluid-filled biasing member 352 of the second arm assembly 300B exerts a force onto a second arm 302B at a location more distal to its pivot joint 358. Accordingly, the force exerted by the fluid-filled biasing member 352 of the second arm assembly 300B may impart a torque (e.g., in a rotational direction 381 about the pivot joint 358) that is greater than the torque imparted by the force exerted by the fluid-filled biasing member 352 of the first arm assembly 300A. As a result, the base position of the first arm 302A may be rotated in the second direction 362 to a greater extent than that of the second arm 302B.

Accordingly, retracting the rod 376 reduces the torque imparted on the arm 302 by the fluid-filled biasing member 352, thereby moving the base position of the arm 302 in the first direction 360 (e.g., to reduce the flotation pressure), and extending the rod 376 increases the torque imparted on the arm 302 by the fluid-filled biasing member 352, thereby moving the base position of the arm 302 in the second direction 362 (e.g., to increase the flotation pressure). As such, the actuator 374 of the second arm assembly 300B may also extend the rod 376 in a translational direction 382 to move the second support 372 toward the pivot joint 358, thereby moving the arm 302 in the second direction 362. For instance, the actuator 374 may move the second support 372 in the translational direction 382 such that the base position of the second arm 302B substantially matches the illustrated base position of the first arm 302A. Similarly, the actuator 374 of the first arm assembly 300A may move the second support 372 away from the pivot joint 358 (e.g., opposite the translational direction 382) to move the arm 302 in the first direction 360, such as to substantially match the base position of the first arm 302A with the illustrated base position of the second arm 302B.

Although the illustrated example shows that the actuator 374 moves the second support 372 to raise the base position of the arm 302 in the first direction 360, and the actuator 374 moves the second support 372 to lower the base position of the arm 302 in the second direction 362, the actuator 374 may move the fluid-filled biasing member 352 relative to the actuator 374 in any suitable manner to change the base position of the arm 302. As an example, in additional or alternative embodiments, the actuator may be configured to move the first support (e.g., relative to the frame), rather than the second support, in order to change the base position of the arm. Indeed, the actuator may be configured to move any portion of the fluid-filled biasing member relative to the actuator to change the torque imparted by the fluid-filled biasing member onto the arm, thereby setting the base position of the arm accordingly.

In some embodiments, the respective actuators 374 may move the corresponding rods 376 independently of one another. As such, the flotation pressures of the respective arms 302 may be independently adjustable from one another. Further, each actuator 374 may move the corresponding rods 376 independently of the fluid pressure in the container 353 and, therefore, the base position and flotation pressure of each arm 302 may be adjusted without substantially changing the respective fluid pressures in each container 353.

In some embodiments, the agricultural system includes a controller 384 configured to control operating parameters of the agricultural system, such as of the arm assemblies 300. The controller 384 may include a microprocessor 386 and a memory 388. The memory 388 may be a mass storage device, a flash memory device, removable memory, or any other non-transitory computer-readable medium that contains instructions regarding control of the arm assemblies 300. The memory 388 may also include volatile memory such as randomly accessible memory (RAM) and/or non-volatile memory such as hard disc memory, flash memory, and/or other suitable memory formats. The microprocessor 386 may be configured to execute the instructions stored in the memory 388 to control the arm assemblies 300. For instance, the controller 384 may be communicatively coupled to the fluid source 368 and may be configured to output a signal to adjust the fluid pressurization in the containers 353 (e.g., by controlling an actuator that controls a valve that adjusts a flow of the fluid between the fluid source 368 and one of the container 353 and/or maintains an amount of fluid within the container 353). In some embodiments, the controller 384 may also be communicatively coupled to pressure sensors 390 configured to determine a respective fluid pressure within each container 353. Each pressure sensor 390 may transmit sensor feedback indicative of a detected fluid pressure, and the controller 384 may output a signal to instruct the fluid source 368 to set the fluid pressure within the containers 353 based on the detected fluid pressure, such as to increase or reduce the amount of fluid supplied to the containers 353.

Furthermore, the controller 384 may be communicatively coupled to the actuators 374 to instruct the actuators 374 to move the rods 376, thereby changing the respective positions of the second support 372. The controller 384 may be communicatively coupled to positions sensors 392 configured to detect a respective position of the arm assemblies 300, such as an amount or degree of rotation of the arms 302 about the respective pivot joints 358, a distance between the arms 302 and the crop field, another suitable reading, or any combination thereof. The position sensors 392 may transmit sensor feedback indicative of the detected positions (e.g., the detected base positions), and the controller 384 may output a signal to instruct the actuators 374 to set a position of the rods 376 accordingly to establish the base position of the arms 302. Additionally or alternatively, the position sensors may be configured to detect a respective position of the second supports (e.g., relative to the corresponding pivot joints), and the controller may be configured to set the positions of the second supports based on the positions detected by the position sensors, thereby setting the base positions of the arms. In further embodiments, the controller may be communicatively coupled to sensors (e.g., a force sensor, a contact sensor) configured to determine a parameter indicative of the flotation pressure of the arm. Such sensors may also provide sensor feedback to the controller, and the controller may use the sensor feedback to set the arms. For example, the controller may determine whether the arms are to be moved so as to match a current flotation pressure with a target flotation pressure.

The agricultural system may further include a user interface 394 that a user, such as an operator of the agricultural system, may use to set the position of the arm assemblies 300. For example, the user may utilize the user interface 394 to input a parameter, such as the flotation pressure, to set the position (e.g., the base position) of the arms 302. Based on the received input, the controller 384 may control the arm assemblies 300 accordingly, such as by outputting a signal to change the fluid pressure in the containers 353, by outputting a signal to instruct the actuators 374 to move the rod 376, by performing another suitable operation, or any combination thereof, to match the operating parameter of the arm assemblies 300 with the target operating parameter input by the user.

In some embodiments, the user interface 394 may include a display 396 that may indicate a certain operating parameter of the agricultural system (e.g., of the arm assemblies 300), and the user may utilize the display 396 to set the target operating parameters of the arm assemblies 300. For instance, the display 396 may include a touchscreen. In additional or alternative embodiments, the user interface may include different features, such as a joystick, a button, a dial, a trackpad, a switch, a keyboard, a mouse, a slider, another suitable features, or any combination thereof, to enable the user to set the operating parameters of the arm assemblies 300.

In additional or alternative embodiments, the controller may control the operating parameters of the arm assemblies automatically (e.g., without input from the user). For instance, the controller may set the position of the arms and/or the fluid pressure in the containers based on a field condition (e.g., a detected field contour), a time of operation, an operating mode, another operating parameter of the arm assembly or of another component of the agricultural system, or any combination thereof.

Furthermore, although the illustrated controller 384 is communicatively coupled to two arm assemblies 300, the controller may be communicatively coupled to any suitable number of arm assemblies, such as all arm assemblies distributed along the width of the header. Indeed, the user may utilize the user interface 394 to adjust the position of any of the arms 302 independently of one another, such that each arm 302 may have a different base position, such that portions of the cutter bar assembly 210 may contact the ground with a different pressure or force, and/or such that portions of the cutter bar assembly 210 may contact the ground with a substantially similar pressure regardless of weight supported by the different portions of the cutter bar assembly 210 (e.g., due to debris build up).

FIG. 6 is a schematic of an embodiment of the user interface 394 that may be used to position the arms 302. The illustrated user interface 394 may be a touchscreen, which may be on the display of the user interface 394, and the user may interact with the user interface 394 to set the flotation pressure of each arms 302. In additional or alternative embodiments, the user interface may have other features that may be used to set the flotation pressure of each arm. In the illustrated embodiment, the user interface 394 enables the user to set respective flotation pressures of a first arm 302A and a second arm 302B. The user may also utilize the user interface 394 to set the flotation pressure of a group of third arms 302C, which includes two different arms 302. That is, setting the flotation pressure of the group of third arms 302C may simultaneously set each arm 302 included in the group of third arms 302C at substantially the same flotation pressure. Additional or alternative embodiments of the user interface may enable the user to set a different set of arms in other embodiments, such as additional arms, fewer arms, or a different set of arms. The user interface may enable the user to select which arms and the number of arms to adjust together.

The user interface 394 may include a respective status display 420 for the first arm 302, the second arm 302B, and the group of third arms 302C. Each status display 420 may illustrate a current position (e.g., a current base position) of the corresponding arm 302. Thus, the user may utilize the status displays 420 to determine whether the current base positions or flotation pressures are desirable. Furthermore, the user interface 394 includes an up icon 422 and a down icon 424 for each of the first arm 302A, the second arm 302B, and the group of third arms 302C. Selection of the up icon 422 may increase the flotation pressure of the corresponding arm 302, such as by moving the arm 302 downward in the second direction 362 (e.g., by moving the fluid-filled biasing member via the actuator) to increase a contact force with the ground. Additionally, selection of the down icon 424 may reduce the flotation pressure of the corresponding arm 302, such as by moving the arm 302 upward in the first direction 360 (e.g., by moving the fluid-filled biasing member via the actuator) to reduce the contact force with the ground. As an example, a single selection of either the up icon 422 and the down icon 424 may adjust the flotation pressure by a particular amount, such as five newtons, and the up icon 422 and the down icon 424 may each be selected multiple times to adjust the flotation pressure by the desired amount. Additionally or alternatively, the up icon 422 and the down icon 424 may remain selected for a prolonged time, such as by the user maintaining contact with the touchscreen of the user interface 394, and the flotation pressure of the arm 302 may continuously change so long as the user maintains contact with either the up icon 422 and the down icon 424.

The user interface 394 further includes an entry icon 426, which may be used by the user to directly input a target flotation pressure of the corresponding arm 302. For instance, the user may input a flotation pressure (e.g., 10 newtons), a percentage of a flotation pressure range (e.g., 100 percent for the highest flotation pressure, 0 percent for the lowest flotation pressure), another suitable entry, or any combination thereof to indicate a target flotation pressure. Upon receiving the target flotation pressure, the controller may then set the position of the arm accordingly so as to match a current flotation pressure (e.g., as detected by a force sensor) with the target flotation pressure input by the user. For instance, in response to receiving the input via the user interface 394, the controller may output a signal to instruct the corresponding actuator to set the position of the rod in order to set the base position of the arm and cause the flotation pressure to be exerted. In addition to or as an alternative to enabling the operator to input a direct indication of the target flotation pressure, the user interface may enable the operator to input any suitable parameter associated with or indicative of the flotation pressure of the arm. For instance, the operator may input a desired base position of the arm, a type of crop harvested by the header, a particular operating mode of the agricultural system, or any combination thereof. In any case, the input may be received by the controller, and the controller may then output a signal to the corresponding actuator to set the position of the rod and set the base position of the arm. In addition to the input, the controller may take into account a current fluid pressure associated with the fluid-filled biasing member, the current position of the support (e.g., relative to the pivot joint) coupled to the fluid-filled biasing member, a geometry of the cutter bar assembly, a weight supported by the arm, or any combination thereof to generate the signal output to the actuator.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C.

The invention claimed is:

1. An agricultural system, comprising:
    an arm of a header, wherein the arm is configured to support a cutter bar assembly, and the arm is configured to rotate about a pivot joint;
    a fluid-filled biasing member configured to couple to the arm, wherein the fluid-filled biasing member is configured to impart a torque onto the arm;
    an actuator coupled to the fluid-filled biasing member, wherein the actuator is configured to move the fluid-filled biasing member along the arm relative to the actuator to change the torque imparted by the fluid-filled biasing member onto the arm; and
    a controller configured to:
        receive an input indicative of a target flotation pressure of the arm; and
        output a signal to instruct the actuator to set a position of the fluid-filled biasing member relative to the actuator based at least in part on the target flotation pressure of the arm.

2. The agricultural system of claim 1, comprising a user interface communicatively coupled to the controller, wherein the input is a user input received via the user interface.

3. The agricultural system of claim 2, wherein the agricultural system comprises:
    an additional arm configured to rotate about an additional pivot joint;
    an additional fluid-filled biasing member configured to couple to the additional arm; and
    an additional actuator coupled to the additional fluid-filled biasing member and configured to move the additional fluid-filled biasing member relative to the additional actuator;
    wherein the controller is configured to:
        receive an additional input indicative of an additional target flotation pressure of the additional arm; and
        output an additional signal to instruct the additional actuator to set a position of the additional fluid-filled biasing member relative to the additional actuator based at least in part on the additional target flotation pressure of the additional arm, wherein the additional signal is output independently from the signal such that the controller controls the additional actuator independently from the actuator.

4. The agricultural system of claim 1, wherein the controller is configured to move a portion of the fluid-filled biasing member away from the actuator to increase a current flotation pressure of the arm, and the controller is configured to move the portion of the fluid-filled biasing member toward the actuator to reduce the current flotation pressure of the arm.

5. The agricultural system of claim 1, wherein the fluid-filled biasing member comprises a container configured to receive fluid from a fluid source fluidly coupled to the fluid-filled biasing member.

6. The agricultural system of claim 5, comprising the fluid source fluidly coupled to the fluid-filled biasing member, wherein the controller is configured to output an additional signal to set a fluid pressure within the container.

7. The agricultural system of claim 1, wherein the controller is configured to move a portion of the fluid-filled biasing member toward the pivot joint to rotate the arm about the pivot joint and lower the arm, and the controller is configured to move the portion of the fluid-filled biasing member away from the pivot joint to rotate the arm about the pivot joint and raise the arm.

8. A non-transitory computer readable medium comprising executable instructions that, when executed by a processor, are configured to cause the processor to:
    receive an input indicative of a target flotation pressure of an arm of a header for an agricultural system, wherein the arm is coupled to a support of a fluid-filled biasing member of the header and configured to rotate about a pivot joint, the fluid-filled biasing member is configured to impart a torque onto the arm, and the support of the fluid-filled biasing member is coupled to an actuator configured to move the support along the arm relative to the pivot joint; and
    output a signal to instruct the actuator to set a position of the support of the fluid-filled biasing member relative to the pivot joint based at least in part on the target flotation pressure of the arm.

9. The non-transitory computer readable medium of claim 8, wherein the instructions, when executed by the processor, are configured to cause the processor to:
    receive sensor feedback indicative of a current flotation pressure of the arm; and
    set the position of the support of the fluid-filled biasing member relative to the pivot joint to match the current flotation pressure of the arm with the target flotation pressure of the arm.

10. The non-transitory computer readable medium of claim 8, wherein the instructions, when executed by the processor, are configured to output the signal to instruct the actuator to set the position of the support of the fluid-filled biasing member relative to the pivot joint based on a current fluid pressure associated with the fluid-filled biasing member, a current position of the support relative to the pivot joint, a geometry of a cutter bar assembly of the header, a weight supported by the arm, or any combination thereof.

11. The non-transitory computer readable medium of claim 8, wherein the input is associated with a direct indication of the target flotation pressure, a target base position of the arm, a type of crop harvested by the header, an operating mode of the agricultural system, or any combination thereof.

12. The non-transitory computer readable medium of claim 8, wherein the instructions, when executed by the processor, are configured to receive the input from a user interface.

13. The non-transitory computer readable medium of claim 8, wherein the instructions, when executed by the processor, are configured to:
receive an additional input indicative of a target fluid pressure of a container of the fluid-filled biasing member; and
output an additional signal to set a fluid pressure of the container based at least in part on the additional input.

14. The non-transitory computer readable medium of claim 13, wherein the instructions, when executed by the processor, are configured to output the signal to instruct the actuator to set the position of the support of the fluid-filled biasing member relative to the pivot joint independently from outputting the additional signal to set the fluid pressure of the container.

15. A header of an agricultural system, comprising:
a cutter bar assembly configured to cut crops during operation of the agricultural system;
an arm assembly comprising:
an arm configured to support a portion of the cutter bar assembly,
wherein the arm is configured to rotate about a pivot joint;
a fluid-filled biasing member comprising a support configured to couple to the arm, wherein the fluid-filled biasing member is configured to impart a torque onto the arm; and
an actuator comprising a rod configured to couple to the support, wherein the actuator is configured to move the support along the arm relative to the pivot joint to change the torque imparted by the fluid-filled biasing member onto the arm; and
a controller communicatively coupled to the arm assembly and configured to:
receive an input indicative of a target flotation pressure of the arm; and
output a signal to instruct the actuator to set a position of the support relative to the pivot joint to set a current flotation pressure of the arm based at least in part on the target flotation pressure of the arm.

16. The header of claim 15, comprising:
an additional arm assembly comprising:
an additional arm configured to support an additional portion of the cutter bar assembly, wherein the additional arm is configured to rotate about an additional pivot joint;
an additional fluid-filled biasing member comprising an additional support configured to couple to the additional arm, wherein the additional fluid-filled biasing member is configured to impart an additional torque onto the additional arm; and
an additional actuator comprising an additional rod configured to couple to the additional support, wherein the additional actuator is configured to move the additional support along the additional arm relative to the additional pivot joint to change the additional torque imparted by the fluid-filled biasing member onto the additional arm.

17. The header of claim 16, wherein the controller is communicatively coupled to the additional arm assembly and is configured to:
receive an additional input indicative of an additional target flotation pressure of the additional arm; and
output an additional signal to instruct the additional actuator to set an additional position of the additional support relative to the additional pivot joint to set an additional current flotation pressure of the additional arm based at least in part on the additional target flotation pressure of the additional arm.

18. The header of claim 17, wherein the controller is configured to output the signal to instruct the actuator to set the current flotation pressure of the arm independently from outputting the additional signal to instruct the additional actuator to set the additional current flotation pressure of the additional arm.

19. The header of claim 17, comprising a user interface, wherein the input and the additional input are received via the user interface.

20. The header of claim 19, wherein the controller is configured to:
receive a further input via the user interface, wherein the further input is indicative of a further target flotation pressure; and
output signals to the actuator and the additional actuator to set the position of the support relative to the pivot joint and to set the additional position of the additional support relative to the additional pivot joint, respectively, such that the current flotation pressure of the arm and the additional current flotation pressure of the additional arm each substantially matches the further target flotation pressure.

* * * * *